United States Patent [19]

Caldwell et al.

[11] Patent Number: 4,737,218
[45] Date of Patent: Apr. 12, 1988

[54] METHOD OF FORMING A FABRIC COVERED SPLINE ASSEMBLY

[75] Inventors: Kenneth G. Caldwell, Maytown; Charles Haines, Jr., Lancaster, both of Pa.

[73] Assignee: Armstrong World Industries, Inc., Lancaster, Pa.

[21] Appl. No.: 946,718

[22] Filed: Dec. 29, 1986

[51] Int. Cl.$^4$ ............ B29C 53/02; B29C 65/48; B29C 65/54
[52] U.S. Cl. ............ 156/212; 52/417; 52/418; 52/461; 52/586; 156/71; 156/294; 156/298; 264/257; 403/267; 403/359; 428/63; 428/223
[58] Field of Search ......... 52/461, 311, 586; 403/265–267, 359; 156/91, 93, 94, 293, 294, 298, 213, 303.1, 212, 71, 216, 287; 29/464, 527.1; 264/103, 257, 248; 24/93, 580; 428/62, 223; 52/288, 417, 418

[56] References Cited

U.S. PATENT DOCUMENTS

| | | | |
|---|---|---|---|
| 1,312,056 | 8/1919 | Shaw | 52/578 |
| 1,818,704 | 8/1931 | Frantz | 52/417 |
| 2,198,316 | 4/1940 | Richardson | 52/417 |
| 3,391,037 | 7/1968 | McNulty | 52/417 |
| 3,783,931 | 1/1974 | Assael | 52/288 |
| 4,018,260 | 4/1977 | Baslow | 52/288 |
| 4,115,180 | 9/1978 | Scalia | 156/201 |
| 4,152,877 | 5/1979 | Green | 52/514 |
| 4,157,271 | 6/1979 | Moore | 52/417 |
| 4,274,904 | 6/1981 | Harrison | 156/475 |

Primary Examiner—Merrell C. Cashion, Jr.

[57] ABSTRACT

A method of forming a fabric covered end on a wallboard spline structure is disclosed herein. A fixture is provided with a series of recesses to position the fabric and the spline in a desired relationship. An adhesive is provided on a portion of the vertical web of the spline and the inserting of the fabric and the spline into the fixture positions the fabric on the desired portion of the spline.

1 Claim, 1 Drawing Sheet

Fig. 1
Fig. 2
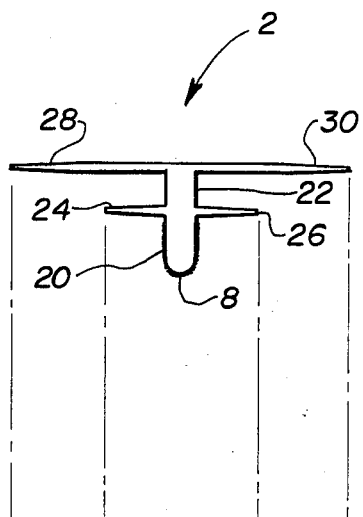
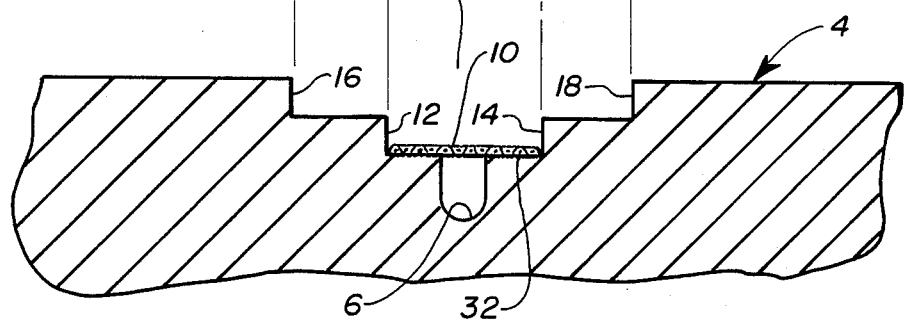

METHOD OF FORMING A FABRIC COVERED SPLINE ASSEMBLY

BACKGROUND OF THE INVENTION

1. Field of the Invention

The invention is directed to the method of forming a fabric covered end on a spline structure and, more particularly, the use of a fixture for guiding the spline and the fabric into the desired relationship.

2. Description of the Prior Art

When the product was initially made, the fabric was handwrapped around a portion of the spline. No mechanism was known to provide for a production line assembly of the fabric and the spline.

SUMMARY OF THE INVENTION

The invention is directed to a method of forming a fabric covered end on a wallboard spline structure. A fixture is provided with a recess to receive the end of a spline structure to be covered with a fabric. Guide means are provided to position the fabric above the recess that is to receive the end of the spline. Guide means are provided to guide the spline into position relative to the fabric and to permit the insertion of both the end of the spline and the fabric into a recess to wrap the fabric on the end of the spline.

Guide means engage the edges of flanges on the spline to guide the spline into position in the recess and the inserting of the end of the spline into the recess pulls the fabric into the recess and wraps it around the end of the spline.

BRIEF DESCRIPTION OF THE DRAWINGS

FIG. 1 is an end view of the spline structure that is to be covered with a fabric on one end thereof; and FIG. 2 is a cross-sectional view of a fixture which guides the spline into position and receives the spline and fabric for the proper positioning of the fabric on the spline.

DESCRIPTION OF THE PREFERRED EMBODIMENT

Referring now to FIG. 1, there is disclosed a spline structure 2. The spline has a vertical web 22 and short flanges 24 and 26 extending from the midpoint of the vertical web and long flanges 28 and 30 extending from the base of the vertical web. On the opposite end of the vertical web 22 there is positioned the end 8 of the spline structure 2 which is to be covered with a fabric material 10 shown in FIG. 2. On the end 8 of the spline, an adhesive coating 20 is positioned so that when the fabric is wrapped around the end 8 of the vertical web of the spline, the fabric will be held in position by the adhesive coating 20.

FIG. 2 shows a fixture 4 with a recess 6 which is to receive the end 8 of the spline structure 2. The recess is sized to have the fabric covered end fit snugly therein. The fixture is provided with guide means 12, 14, 16 and 18 which are wall structures used to guide the ends of the flanges so that the end 8 is inserted into recess 6. Walls 12 and 14 guide the ends of flanges 22 and 24 and walls 16 and 18 guide the ends of flanges 28 and 30. The fixture is so constructed and arranged so that the walls 16 and 18 are spaced apart the distance between the ends of the flanges 28 and 30 and when these flanges are at the base of the walls 16 and 18, the end 8 is inserted into recess 6. Likewise, walls 12 and 14 are spaced apart the same distance as the distance between the ends of flanges 24 and 26 and when these ends are at the base of walls 12 and 14, the end 8 is inserted in recess 6. The surface 32 at the base of walls 12 and 14 form a surface to receive the fabric 10 which is now disposed above the recess 6 and an equal distance either side of the recess so that when the end 8 is pressed into the recess 6, the fabric is caused to wrap around the end 8 of the spline.

The method of using the fixture of FIG. 2 to form a fabric covered end on a wallboard spline structure comprises the following steps. There is provided the fixture 4 with the recess 6 to receive the end 8 of the spline structure 2. This end 8 is the part of the spline structure to be covered with a fabric material 10. The recess is sized to have the fabric covered end fit snugly therein. The fixture is provided with guide means 12, 14, 16 and 18 to position the fabric material lying flat above the recess 6 with the fabric material edges located an equal distance either side of the recess. The guide means also guide the ends of the splines into the center of the recess. An adhesive coating 20 is placed on the end 8 of the spline. The inserting of the end of the spline properly centered by the guide means is carried out so that the end 8 of the spline is inserted into fixture recess 6 and, at the same time, the fabric material is forced around the adhesive coated end of the spline structure.

The fixture is provided with a base 32 in a depressed area 34. The depressed area has the wall means 12, 14, 16 and 18 which form the guide means for the flanges of the spline. One or both flanges of the spline may be used for guiding purposes. The fabric material rests upon the base 32.

It can be seen that with the fabric resting on the base 32 and the spline being guided by the walls 12, 14, 16 and 18, the end 8 is guided into the recess 6 and the fabric is wrapped around the end 8 of the spline. The adhesive 20, which can be on the end 8 or the fabric 10, will hold the fabric in place.

What is claimed is:

1. A method of forming a fabric-covered end on a wallboard spline structure comprising the steps of:
   (a) providing a fixture with a three-step recess of an upper larger recess, lower smallest recess, and an intermediate recess to receive the end of a spline structure with four flanges, the end of the spline structure to be covered with a fabric material, said lower smallest recess being sized to have the fabric covered end fit snugly therein;
   (b) further providing the fixture with a base and guide means to position the fabric laying flat above the lower smallest recess with the fabric material edges located an equal distance either side of the lower smallest recess, said guide means also guiding the ends of the flanges of the spline so that the end of the spline structure is received in the lower smallest recess, said intermediate and upper recesses having wall means which form the guide means;
   (c) placing an adhesive coating on the fabric;
   (d) placing the fabric on the base above the lower smallest recess in the fixture and properly locating said fabric above the lower smallest recess of the fixture by the guide means of the large and intermediate recesses; and
   (e) inserting the end of the spline, properly centered by the guide means engaging the end of the four flanges, into the fixture lower smallest recess and, at the same time, forcing the fabric material around the end of the spline structure so that the adhesive bonds the end to the fabric.

* * * * *